United States Patent
Seo et al.

(10) Patent No.: US 7,385,783 B2
(45) Date of Patent: Jun. 10, 2008

(54) LEVER FIXING APPARATUS OF CASSETTE HOUSING AND MAGNETIC RECORDING AND REPRODUCING APPARATUS WITH THE SAME

(75) Inventors: Jae-Kab Seo, Suwon-si (KR);
Jun-Young Kim, Suwon-si (JP);
Bong-Joo Kim, Suwon-si (KR);
Young-Ho Cho, Suwon-si (KR);
Chung-hum Baik, Suwon-si (KR);
Myoung-Joon Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 492 days.

(21) Appl. No.: 11/062,639

(22) Filed: Feb. 23, 2005

(65) Prior Publication Data
US 2005/0280931 A1    Dec. 22, 2005

(30) Foreign Application Priority Data
Jun. 18, 2004    (KR)    ...... 10-2004-0045416

(51) Int. Cl.
*G11B 15/675*    (2006.01)
(52) U.S. Cl. .................................. 360/96.6
(58) Field of Classification Search .......... 360/98.5, 360/96.6, 85
See application file for complete search history.

(56) References Cited

U.S. PATENT DOCUMENTS

| 4,811,138 | A | * | 3/1989 | Park .......................... 360/96.5 |
| 5,025,332 | A | * | 6/1991 | Tsuchida et al. ............... 360/85 |
| 5,291,352 | A | * | 3/1994 | Nagasawa ..................... 360/85 |
| 5,390,055 | A | * | 2/1995 | Maehara et al. ............... 360/85 |
| 5,523,907 | A | * | 6/1996 | Seo et al. .................. 360/96.5 |
| 5,754,360 | A | * | 5/1998 | Lee et al. ..................... 360/85 |
| 5,999,364 | A | * | 12/1999 | Aoki et al. ................ 360/96.6 |
| 6,038,100 | A | * | 3/2000 | Nagatsuka ................. 360/96.6 |
| 6,072,658 | A | * | 6/2000 | Kumagai .................... 360/96.5 |
| 6,198,596 | B1 | * | 3/2001 | Kumagai et al. .......... 360/96.5 |
| 6,624,965 | B1 | * | 9/2003 | Kumagai et al. .......... 360/96.5 |
| 6,754,039 | B2 | * | 6/2004 | Kumagai .................... 360/96.5 |
| 2001/0012173 | A1 | * | 8/2001 | Kumagai .................... 360/96.5 |

FOREIGN PATENT DOCUMENTS

| JP | 60-74146 | 4/1985 |
| KR | 1987-17283 | 7/1989 |
| KR | 1996-18752 | 5/1998 |

* cited by examiner

*Primary Examiner*—William Korzuch
*Assistant Examiner*—Mark Blouin
(74) *Attorney, Agent, or Firm*—Roylance, Abrams, Berdo & Goodman, L.L.P.

(57) ABSTRACT

A lever fixing apparatus of a cassette housing has at least one lever for connecting a cassette holder to a chassis and at least one snap fixing unit for connecting the lever to at least one of the cassette holder and the chassis in a snap manner to hingedly fix the lever thereto. The lever fixing apparatus can fix the lever to the chassis without using additional coupling parts. Accordingly, the number of processes for assembling the cassette holder to the housing bracket can be reduced and the working time is saved, thereby the productivity being increased.

18 Claims, 11 Drawing Sheets

LEVER FIXING APPARATUS OF CASSETTE HOUSING AND MAGNETIC RECORDING AND REPRODUCING APPARATUS WITH THE SAME

CROSS-REFERENCE TO RELATED APPLICATIONS

This application claims the benefit under 35 U.S.C. §119 (a) of Korean Patent Application No. 2004-45416 filed on Jun. 18, 2004, in the Korean Intellectual Property Office, the entire disclosure of which is incorporated herein by reference.

BACKGROUND OF THE INVENTION

1. Field of the Invention

The present invention relates to a lever fixing apparatus of a cassette housing and a magnetic recording and reproducing apparatus with the same.

2. Description of the Related Art

Generally, a magnetic recording and reproducing apparatus, such as a camcorder and a videocassette recorder (VCR), has a cassette housing for loading and unloading a cassette to and from a reel table of a deck.

FIG. 1 shows a conventional cassette housing of a magnetic recording and reproducing apparatus.

A cassette housing includes a chassis 3 having a front plate 1 and side plates 2 and 2' provided at both sides, X-shaped lever assemblies 7 and 7' for fixing first and second levers 4, 4' and 5, 5', which are connected to each other by respective connecting pins 6 and 6' (see FIG. 3A), on the side plates 2 and 2' of the chassis 3, respectively, a cassette holder 8 fixed to upper portion of the X-shaped lever assemblies 7 and 7', eject springs 9 and 9' for connecting upper portions of the first and second levers 4, 4' and 5, 5', a locking lever 11 having an operating portion 11a provided at a lower portion and rotatably connected to the side plate 2 of the chassis 3 by a shaft pin 10, a hook pin 12 fixed on a sidewall of the cassette holder 8 and selectively hooked on the locking lever 11, a tension spring 13 for biasing the locking lever 11, a damper gear 14 rotatably coupled at a rear side of the wall of the cassette holder 8, and a sector gear 15 formed on an upper portion of the first lever 4 and engaged with the damper gear 14.

The operation of the above-described conventional cassette housing will be briefly described hereinafter.

In the operation of positioning the cassette holder 8 to a seating position, when the cassette holder 8 is gently depressed in a state where it is ejected as shown in FIGS. 2B and 3B, the X-shaped lever assemblies 7 and 7' are folded up and descended as the ejected springs 9 and 9' connected between the first and second levers 4, 4' and 5, 5', are tensioned. Therefore, the locking lever 11 is hooked on the hook pin 12 of the cassette holder 8, thereby positioning the cassette holder 8 in the seating position as shown in FIGS. 2A and 3A.

In the ejecting operation of the cassette holder 8, when the operation portion 11a of the locking lever 11 is pushed by a locking lever operating unit (not shown) in an arrow direction A as shown in FIG. 2B in a state where the cassette holder 8 is loaded in the loading position as shown in FIGS. 2A and 3A. The locking lever 11 rotates counterclockwise around the shaft pin 10 against the biasing force of the tension spring 13, thereby making the hook pin 12 of the cassette holder 8 free. As a result, the X-shaped lever assemblies 7 and 7' are unfolded (widened or opened) by the eject springs 9 and 9', thereby ejecting the cassette holder 8 as shown in FIGS. 2B and 3B.

In the above-described cassette housing, the cassette holder 8 is fixed on the side plates 2 and 2' of the chassis 3 by sliding fixing units 16 and 16' formed on the side plates 2 and 2' and the first lever 4 and 4' and by hinge fixing units 19 and 19' formed on the side plates 2 and 2' and the second levers 5 and 5'.

That is, as shown in FIGS. 2B and 3B, after projection pins 17 and 17' formed on lower portions of the first levers 4 and 4' are inserted into pin insertion holes 18 and 18' formed on the side plates 2 and 2' and the shaft pins 20 and 20' are inserted into shaft pin holes 21 and 21' formed on lower portions of the second levers 5 and 5' and the side plates 2 and 2', the cassette holder 8 is fixed on the chassis 3 by a suitable fixing means, for example, washers (not shown).

However, since a plurality of additional coupling parts such as the shaft pins 20 and 20' that will be inserted into the shaft pin holes in the course of a fixing process are required, the fixing process is complicated and the assembly time is increased, thereby diminishing productivity.

SUMMARY OF THE INVENTION

Therefore, an object of the present invention is to provide a lever fixing apparatus of a cassette housing, which can fix a cassette holder on a chassis without using any additional parts, and a magnetic recording and reproducing apparatus with the same.

According to an aspect of the present invention, the present invention provides a lever fixing apparatus of a cassette housing comprising at least one lever connecting a cassette holder to a chassis, and at least one snap fixing unit connecting the lever to at least one of the cassette holder and the chassis in a snap manner to hingedly fix the lever thereto.

The snap fixing unit may comprise an intermediate member installed between the lever and the at least one of the cassette holder and the chassis; a first snap rotatably fixing the lever to the intermediate member; and a second snap fixing the intermediate member to the chassis.

The first snap may comprise a pivot boss formed on one of the lever and the intermediate member; and a pivot boss receiving hole formed on the other one of the lever and the intermediate member.

The first snap may further comprise a separation preventing member preventing the pivot boss from being separated from the pivot boss receiving hole when the lever is hingedly operated.

The separation preventing member may comprise at least one hook formed on one of the lever and the intermediate member; and at least one hook receiving member being formed at or on the other one of the lever and the intermediate member and provided with an assembling enlarging hole in which the hook is inserted and a supporting hole rotatably supporting the hook inserted through the assembling enlarging hole by a predetermined angle.

The assembling enlarging hole may be formed out of a hinge operation range of the lever and the supporting hole may be formed in a pivot operation range of the lever.

The first snap may further comprise a position maintaining member preventing the intermediate member from being separated from an assembling position during the hinge operation of the lever.

The position maintaining member may comprise a projection extending from the intermediate member to be in contact with the lever.

The second snap may comprise a slide slot formed on one of the intermediate member and the chassis; and a slot guide groove formed on the other one of the intermediate member and the chassis to correspond to the slide slot.

The second snap may further comprise a locking member preventing the slot guide groove from being separated from the slide slot.

The locking member may comprise a locking projection formed on one of the intermediate member and the chassis; and a locking projection receiving portion formed on the other one of the intermediate member and the chassis.

In another aspect of the present invention, there is provided a magnetic recording and reproducing apparatus comprising a cassette holder receiving a cassette; a chassis installed on a deck; and a cassette holder elevating unit supporting the cassette holder on the chassis to move the cassette holder between a seating position where the cassette holder is seated on a tape reel on the deck and an ejecting position where the cassette holder is ejected to remove or receive the cassette, wherein the cassette holder elevating unit comprises a first lever having a first end hingedly fixed on the cassette holder and a second end slidably supported on the chassis; a second lever having a first end slidably supported on the cassette holder and a second end hingedly fixed on the chassis; and at least one snap fixing unit connecting at least one of the first end of the first lever and the second end of the second lever to at least one of the corresponding cassette holder and the corresponding chassis in a snap or hinge manner.

The snap fixing unit may comprise an intermediate member installed between the at least one of the first end of the first lever and the second end of the second lever and the at least one of the corresponding cassette holder and the corresponding chassis; a first snap rotatably fixing the at least one of the first end of the first lever and the second end of the second lever on the intermediate member; and a second snap fixing the intermediate member to the at least one of the cassette holder and the chassis.

The first snap may comprise a pivot boss formed on one of the at least one of the first end of the first lever and the second end of the second lever and the intermediate member; and a pivot boss receiving hole formed on the other one of the at least one of the first end of the first lever and the second end of the second lever and the intermediate member.

The first snap may further comprise a separation preventing member preventing the pivot boss from being separated from the pivot boss receiving hole when the at least one of the first end of the first lever and the second end of the second levers is hingedly operated.

The separation preventing member may comprise a hook formed on the at least one of the first end of the first lever and the second end of the second lever and the intermediate member; and a hook receiving member being formed at or on the other one of the at least one of the first end of the first lever and the second end of the second lever and the intermediate member and provided with an assembling enlarging hole in which the hook is inserted and a supporting hole rotatably supporting the hook inserted through the assembling enlarging hole by a predetermined angle.

The assembling enlarging hole may be formed out of the hinge operation range of the lever and the supporting hole may be formed in the pivot operation range of the hook.

The second snap may comprise a slide slot formed on one of the at least one of the cassette holder and the chassis and the intermediate member; and a slot guide groove formed on the other one of the at least one of the cassette holder and the chassis and the intermediate member.

The second snap may further comprise a locking member preventing the slot guide groove from being separated from the slide slot.

The locking member may comprise a locking projection formed on one of the at least one of the cassette holder and the chassis and the intermediate member; and a locking projection receiving portion formed on the other one of the at least one of the cassette holder and the chassis and the intermediate member.

BRIEF DESCRIPTION OF THE DRAWINGS

The above aspects and features of the present invention will be more apparent by describing certain embodiments of the present invention with reference to the accompanying drawings, in which.

Throughout the drawings, it should be understood that like reference numbers refer to similar features, structures and elements.

DETAILED DESCRIPTION OF EXEMPLARY EMBODIMENTS

Certain embodiments of the present invention will now be described in greater detail with reference to the accompanying drawings.

Figure 1:
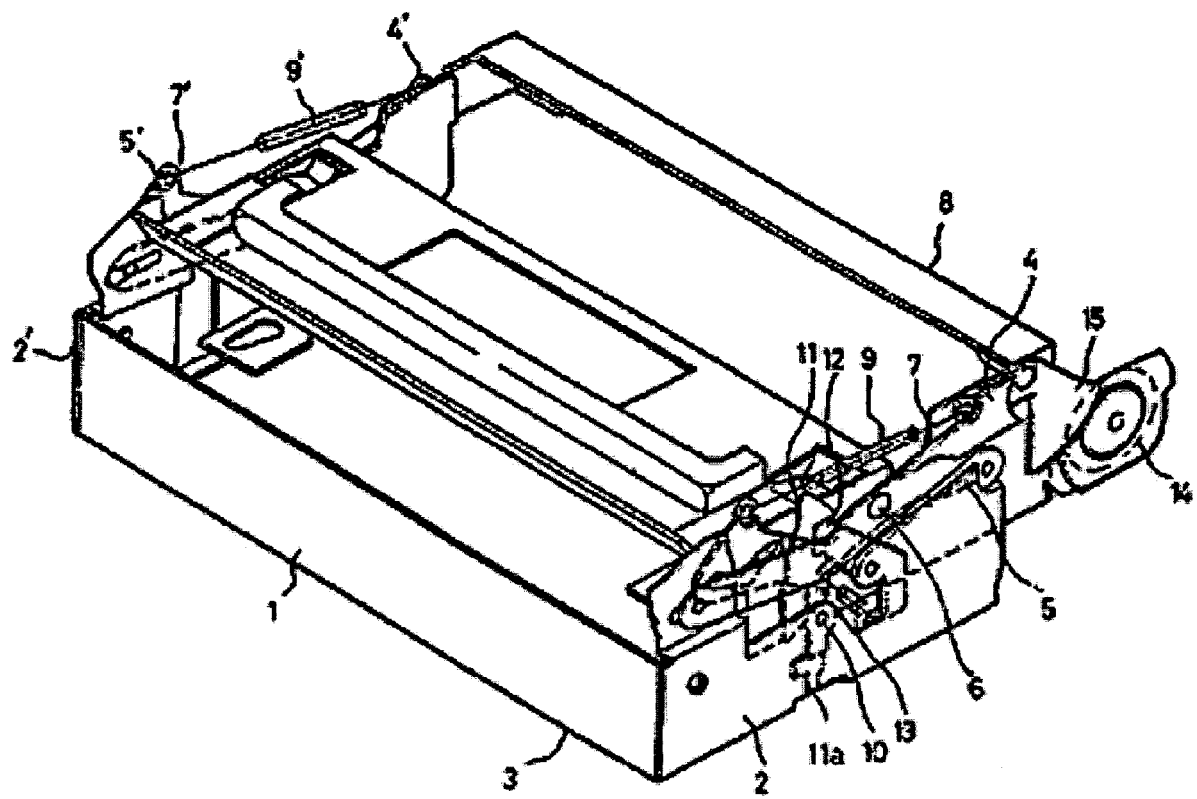
FIG. 1 is a perspective view of a cassette housing of a conventional magnetic recording and reproducing apparatus.
Figure 2A:
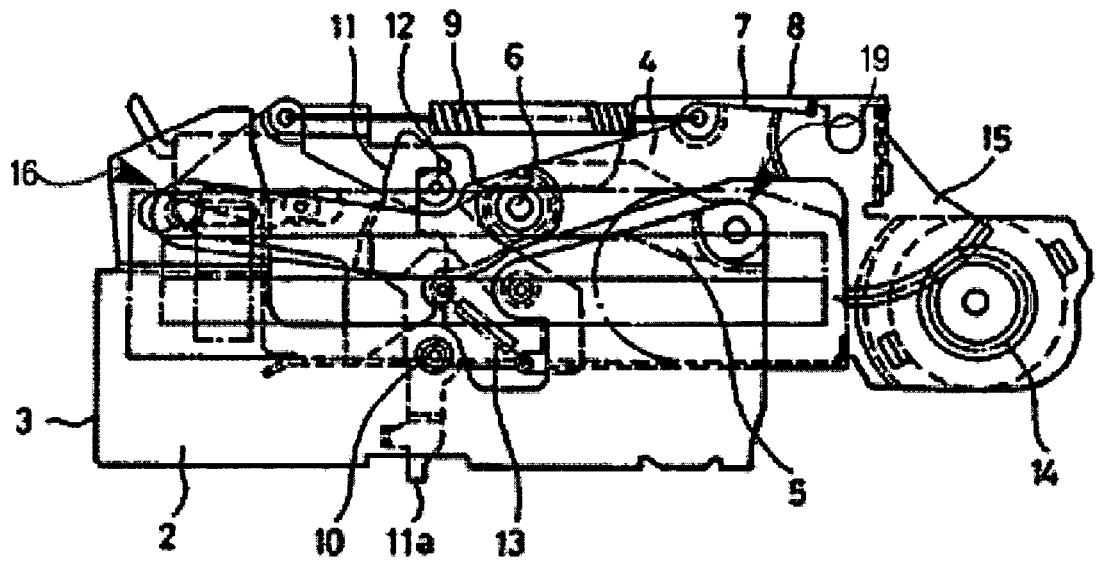
FIGS. 2A and 2B are right side views of a cassette housing depicted in FIG. 1.
Figure 2B:
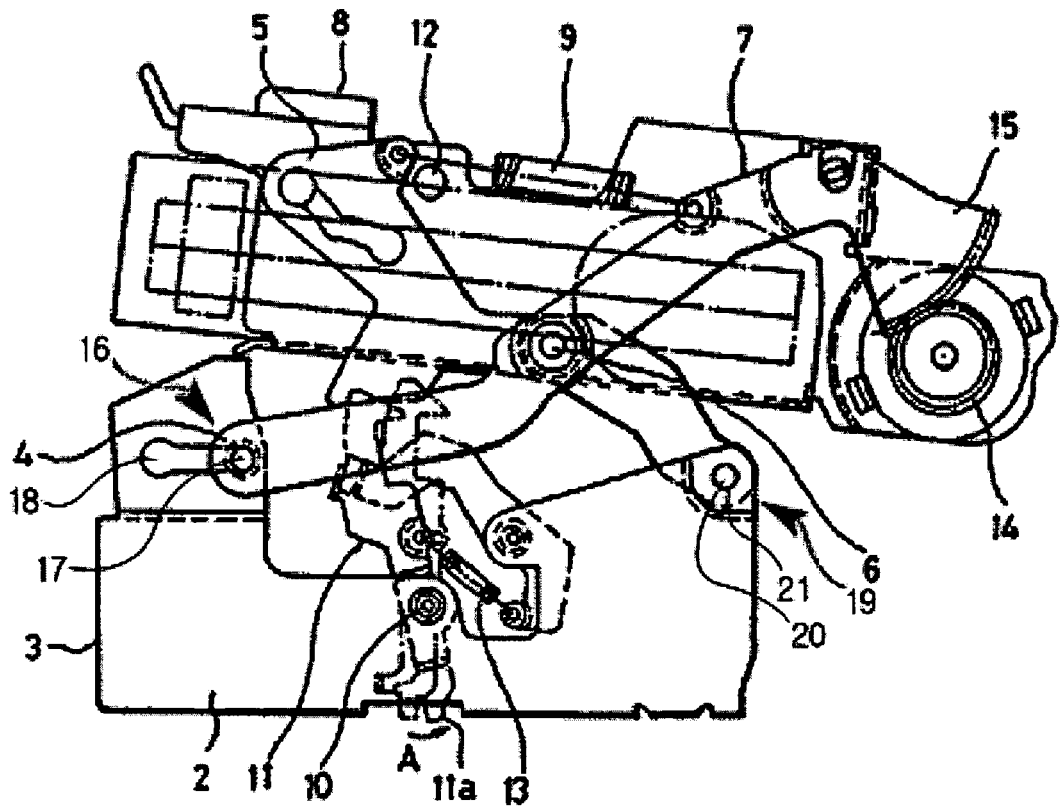
Figure 3A:
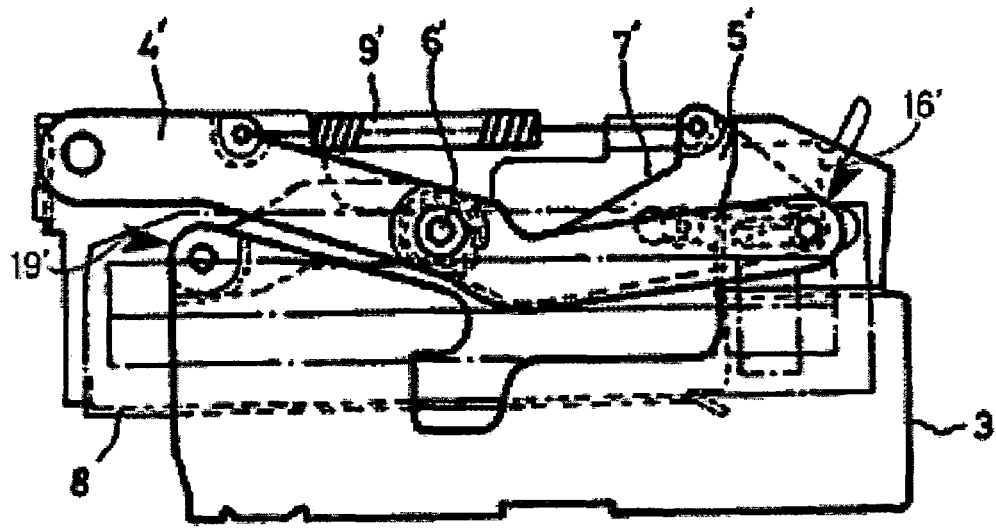
FIGS. 3A and 3B are left side views of a cassette housing depicted in FIG. 1.
Figure 3B:
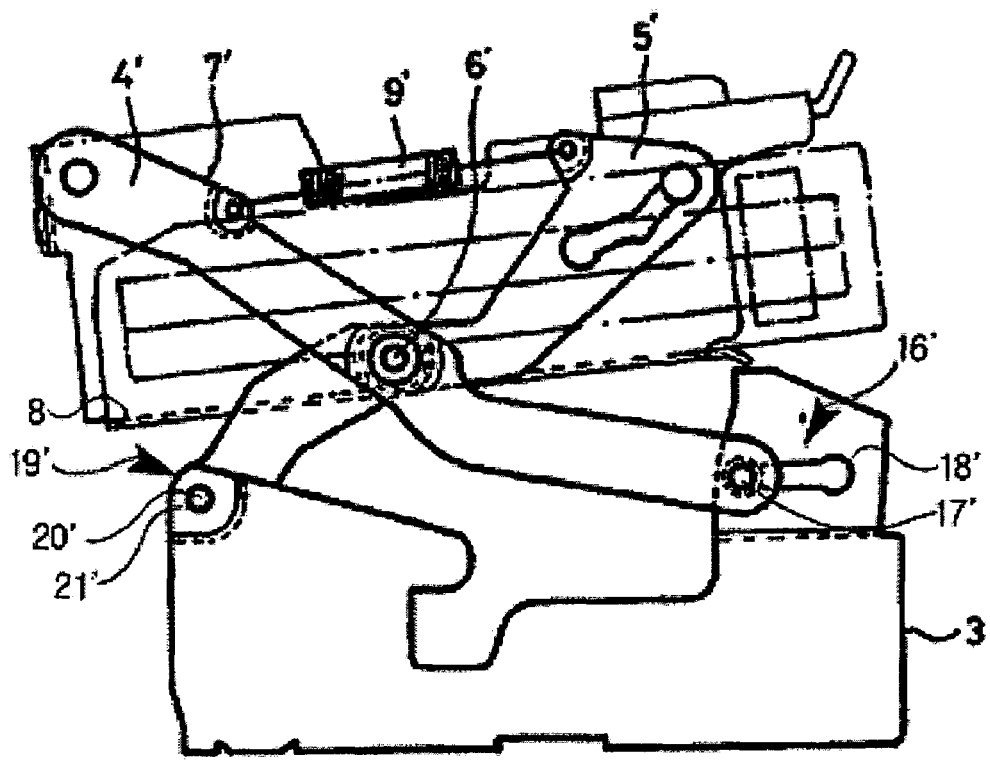
Figure 4:
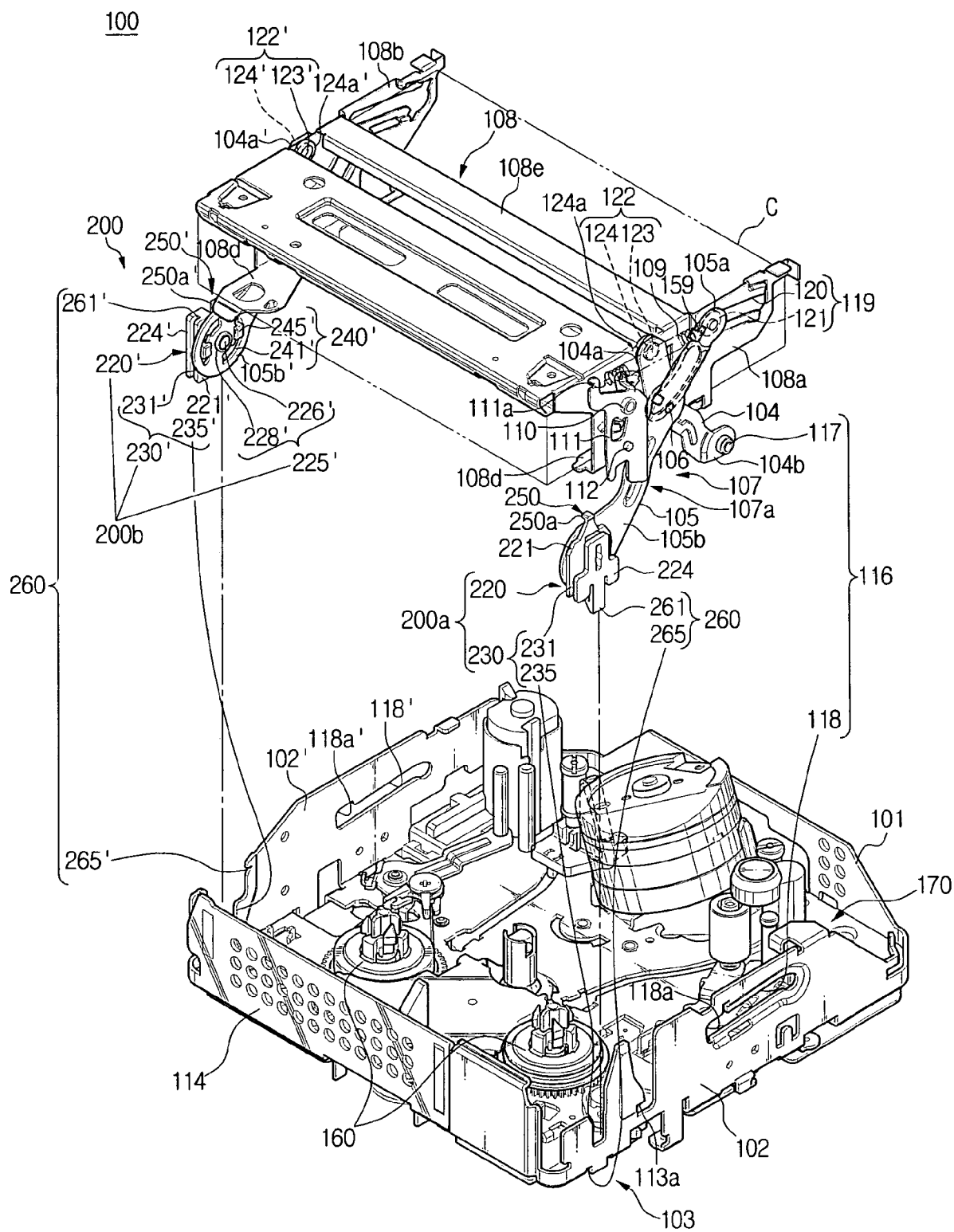
FIG. 4 is an exploded perspective view of a cassette housing of a magnetic recording and producing apparatus where a lever fixing apparatus according to an embodiment of the present invention is applied.

The matters defined in the description such as a detailed construction and elements are provided to assist in a comprehensive understanding of the invention. Thus, well-known functions or constructions are omitted for the sake of clarity and conciseness FIG. 4 shows a cassette housing 100 of a magnetic recording and reproducing apparatus such as a VCR and a camcorder where a lever fixing apparatus according to an embodiment of the present invention is employed.

As shown in the drawing, a cassette housing 100 comprises a chassis 103 mounting a deck 170 and fixed on a main frame (not shown) of a magnetic recording and reproducing apparatus, receiving a deck 170, a cassette holder 108 holding a cassette C, and a cassette holder elevating unit 107 fixing the cassette holder 108 on the chassis 103 to move the cassette holder 108 between a seating position (not shown) at which the cassette holder 108 is seated on a reel table 160 on the deck 170 and an ejecting position (see FIGS. 5B and 7B) at which the cassette holder 108 is ejected to remove or receive the cassette C.

The chassis 103 comprises front and rear plates 114 and 101 and right and left plates 102 and 102' formed on both sides of the front and rear plates 114 and 101.

The cassette holder 108 comprises right and left plates 108a and 108b connecting both sides of the upper plate 108e to define a space for receiving the cassette c, being respectively provided with holder supports 108d and 108d'.

The cassette holder elevating unit 107 comprises right and left X-shaped lever assemblies 107a and 107b (see FIGS. 7A and 7B) respectively installed on the right and left plates 108a and 108b of the cassette holder 108, a locking lever 111 for locking the cassette holder 108 at the seating position, and an eject spring 109 for returning the cassette holder 108 to the ejecting position when the locking lever 111 is released. The right and left shaped lever assemblies 107a and 107b are hinged about rotating point 106 and 106', respectively.

Since the right and left X-shaped lever assemblies 107a and 107b have an identical structure to each other except for their installed positions, only the right X-shaped lever assembly 107a will be described in this embodiment with reference to FIGS. 4, 5A and 5B.

Figure 5A:
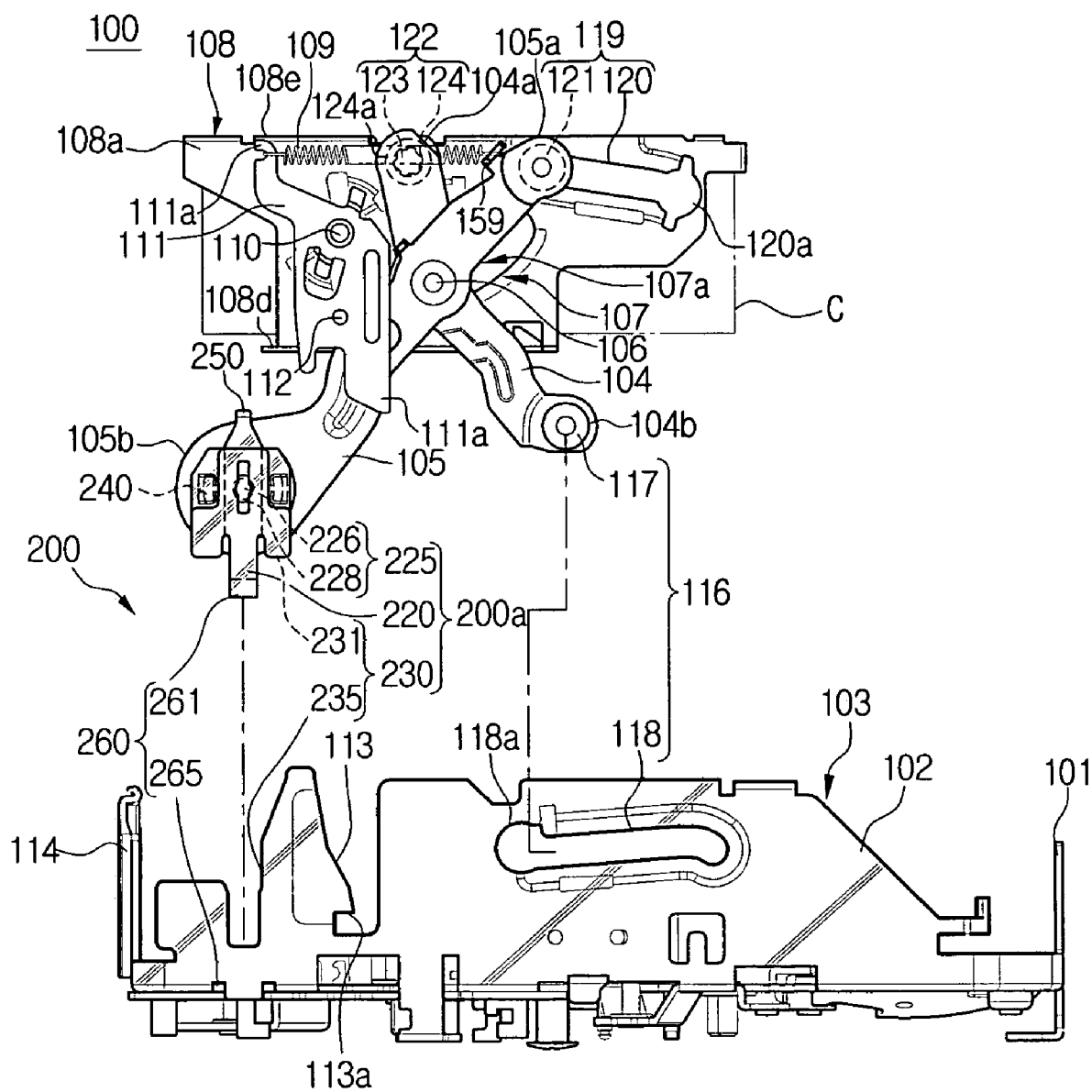
FIGS. 5A and 5B are respectively exploded right side and assembled right side views of a cassette housing depicted in FIG. 4.
Figure 5B:
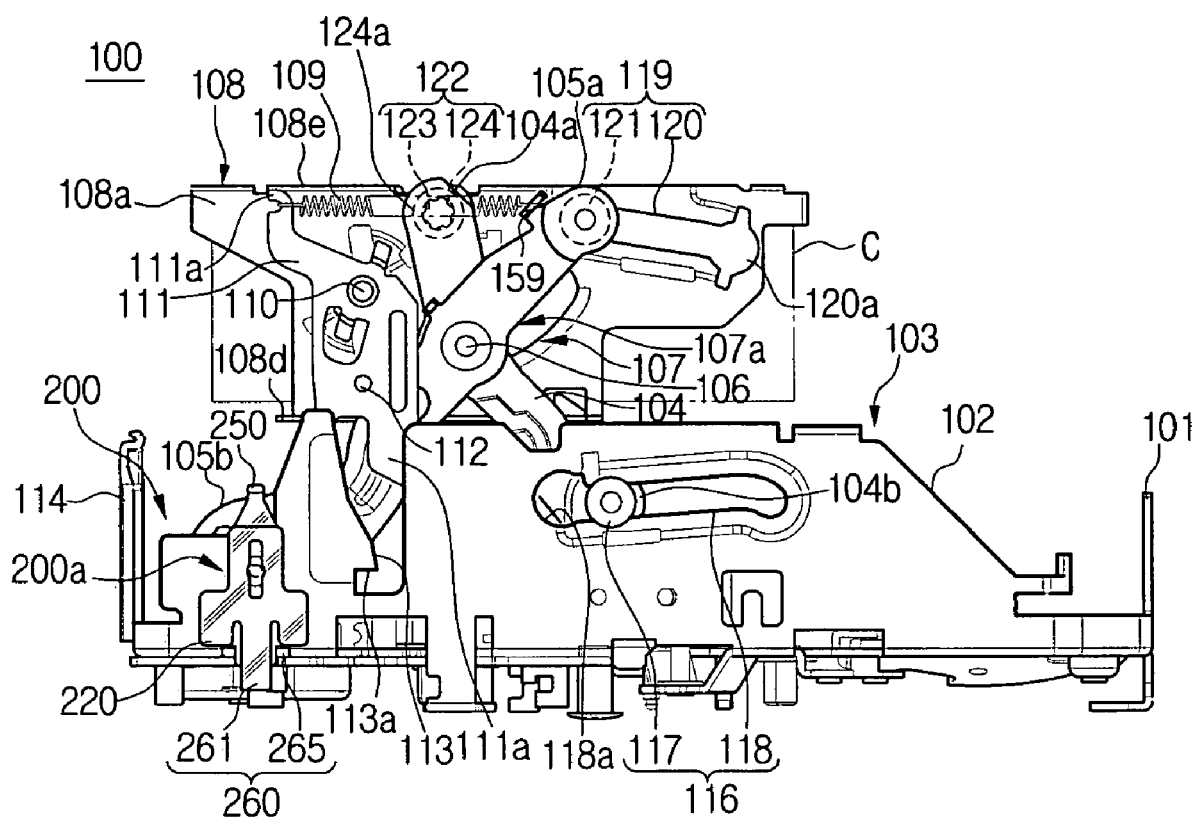

As shown in FIGS. 5A and 5B, the right X-shaped lever assembly 107a comprises first and second right levers 104 and 105.

The first right lever 104 comprises an upper end 104a hingedly fixed on the right plate 108a of the cassette holder 108 by a right hinge portion 122 and a lower end 104b slidably supported on the right plate 102 of the chassis 103 by a first right sliding fixing unit 116.

The right hinge portion 122 comprises a first pivot boss 123 formed on the upper end 104a of the first right lever 104, a first pivot boss receiving hole 124 formed on the right plate 108A of the cassette holder 108, and a fixing washer 124a (see FIG. 4) fixing the first pivot boss 123 in the first pivot boss receiving hole 124. A left hinge portion 122' comprises a first pivot boss 123' formed on the upper end 104a' of the first left lever 104', a first pivot boss receiving hole 124' formed on the left plate 108a' of the cassette holder 108', and a fixing washer 124a' (see FIG. 4) fixing the first pivot boss 123' in the first pivot boss receiving hole 124'. The first right sliding fixing unit 116 comprises a first sliding boss 117 formed on the lower end 104b of the first right lever 104 and a first sliding boss receiving hole 118 having a first assembling enlarging hole 118a formed on the right plate 102 of the chassis 103 corresponding to the first sliding boss 117.

The second right lever 105 comprises an upper end 105a slidably supported on the right plate 108a of the cassette holder 108 by a second right sliding fixing unit 119 and a lower end 105b pivotally fixed on the chassis 103 in a snap manner by a right snap fixing unit 200a of a lever fixing apparatus 200 that will be a feature of the present invention. The lever fixing apparatus 200 will be described below in more detail.

The second sliding fixing unit 119 comprises a second sliding boss 121 formed on the upper end 105a of the second right lever 105 and a second sliding boss receiving hole 120 having a second assembling enlarging hole 120a (See FIG. 5A) formed on the right plate 108a corresponding to the first sliding boss 117.

The lever fixing apparatus according to an embodiment of the present invention comprises a right snap fixing unit 200a snap-connecting the lower end 105b of the second right lever 105 of the right X-shaped lever assembly 107a to the right plate 102 of the chassis 103 and hingedly fixing the lower end 105b of the second right lever 105 to the right plate 102 of the chassis 103, and a left snap fixing unit 200b (not shown) preferably snap-connecting the lower end 105b' of the second left lever 105' of the left X-shaped lever assembly 107b (see FIGS. 7A and 7B) to the left plate 102' of the chassis 103 and hingedly fixing the lower end 105b' of the second left lever 105' to the left plate 102' of the chassis 103

As shown in FIGS. 5A and 5B in more detail, the right snap fixing unit 200a comprises a right intermediate member 220 installed between the lower end 105b of the second right lever 105 and the right plate 102 of the chassis 103, a first right snap 225 rotatably fixing the lower end 105b of the second right lever 105 to the right intermediate member 220, and a second right snap 230 for fixing the right intermediate member 220 to the right plate 102 of the chassis 103.

Figure 6A:
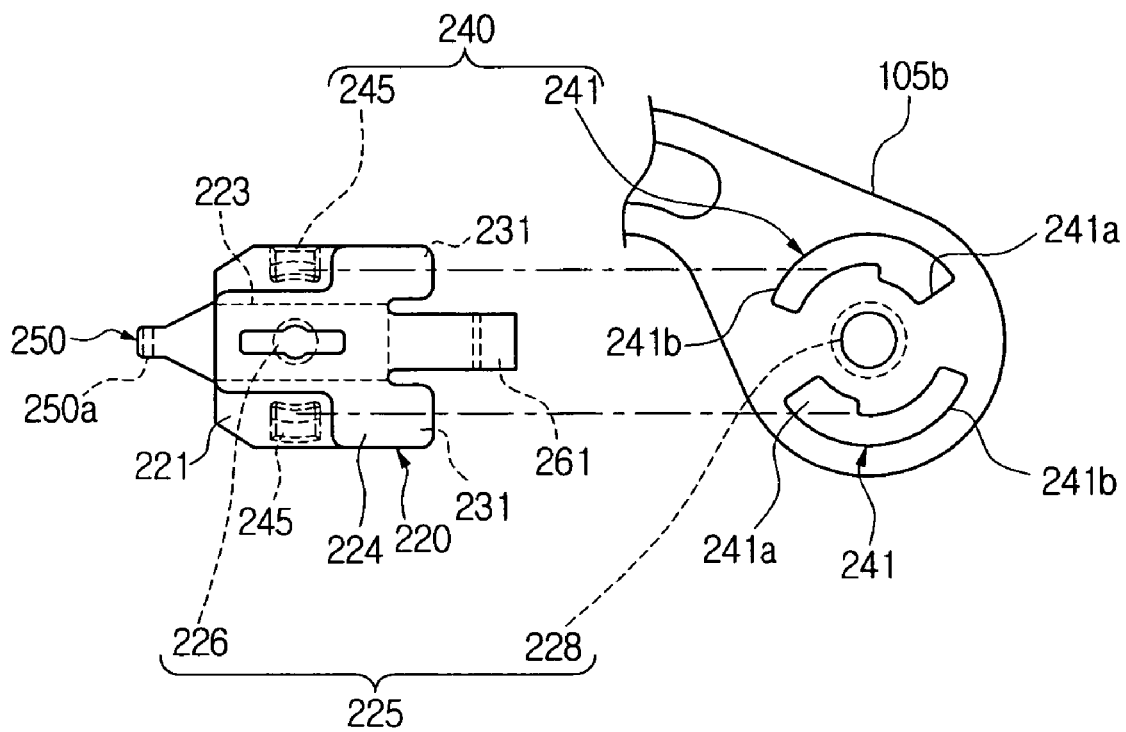
FIGS. 6A, 6B and 6C are respectively exploded right side, assembled right side and assembled perspective views of a right intermediate member and a first right snap of a right snap fixing unit of the lever fixing apparatus of a cassette housing depicted in FIGS. 5A and 5B.
Figure 6B:
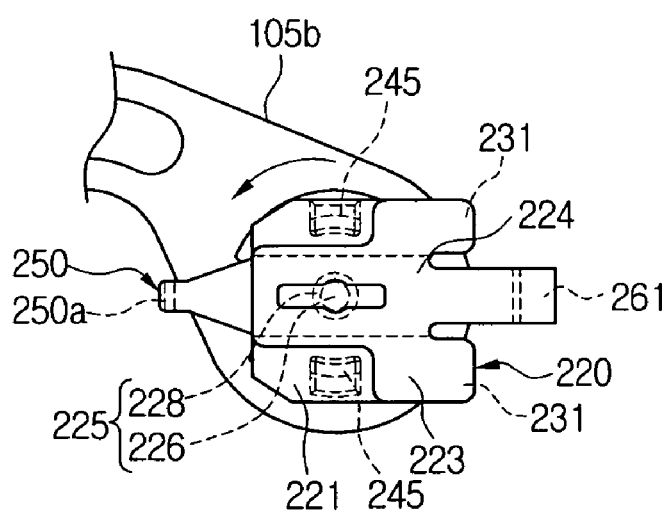
Figure 6C:
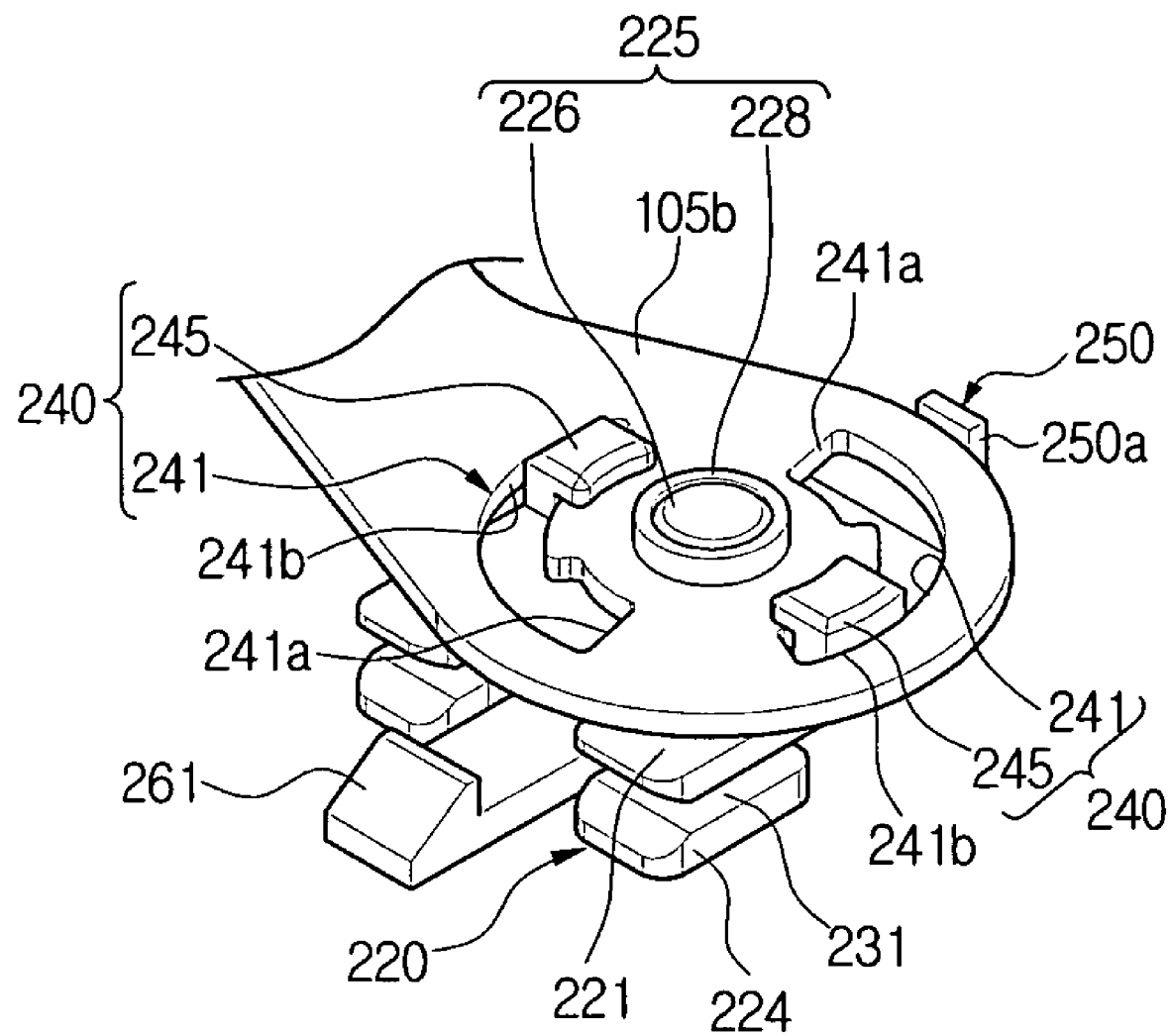

As shown in FIGS. 6A through 6C, the intermediate member 220 comprises a first plate 221 formed in a substantially rectangular shape, a second plate 224 formed in a substantially triangular shape, and an intermediate connecting portion 223 connecting the first and second plates 221 and 224 to each other, defining an I-shaped section.

The first plate 221 is provided at a surface facing the lower end 105b of the second right lever 105 with a second pivot boss 226 of the first right snap 225 and a hook 245 of the separation preventing member 240.

The intermediate connecting portion 223 (See FIG. 6A) has a width identical or slightly less than that of a slide slot 235 (see FIG. 5A) of the second right snap 230. Accordingly, A slot guide groove 231 (See FIGS. 4 and 6C) for receiving the slide slot 235 of the second right snap 230 is formed along both edges of the intermediate connecting portion 223 between the first and second plates 221 and 224.

Referring to FIG. 6A, the first right snap 225 comprises a second pivot boss 226 formed on a surface of the first plate 221, which faces the lower end 105b of the second right lever 105 and a second pivot boss receiving hole 228 facing the second pivot boss 226 at the lower end 105b of the second right lever 105.

The first right snap 225 further comprises a separation preventing member 240 preventing the second pivot boss 226 from being separated from the second boss receiving hole 228 in the course of pivoting operation of the lower end 105b of the second right lever 105.

The separation preventing member 240 comprises two hooks 245 formed on a surface of the first plate 221 of the right intermediate member 220, which faces the lower end 105b of the second right lever 105, and two hook receiving portions 241 formed on the lower end 105b of the second right lever 105. Each of the hook receiving portions 241 preferably has third assembling enlarging holes 241a to receive the hook 245 and a supporting hole 241b pivotally supporting the hooks 245 inserted through the third assembling enlarging hole 241a at a predetermined angle. At this point, when the lower end 105b of the second right lever 105 pivoting with respect to the right intermediate member 220 at a predetermined angle is hingedly operated, the hook 245 may be removed through the third assembling enlarging hole 241a. To prevent this, the third assembling enlarging hole 241a is formed out of the hinge operation range of the lower end 105b, in other words, out of the pivot operation range of the hooks 245 and the support holes 241b is formed in the pivot operation range of the hooks 245.

In addition, the first right snap 225 may further comprise a position maintaining member 250 preventing the right intermediate member 220 from being separated from the assembled position in the course of the hinge operation of the lower end 105b of the second right lever 105. As shown in FIG. 6C, the position maintaining member 250 may be formed of a projection 250a extending from the first plate 221 of the right intermediate member 220 to be in contact with the outer surface of the lower end 105b of the second right lever 105.

The second right snap 230 comprises a slide slot 235 (See FIG. 4) formed on the right plate 102 of the chassis 103 and a slide slot guide groove 231 formed on the right intermediate member 220 to be inserted in the slide slot 235. The slide slot 235 is formed in an opening defining by preferably cutting the right plate 102 of the chassis 103 in a linear shape (See FIG. 4). The slot guide groove 231 is, as shown in FIGS. 6A and 6B, formed along both edges of the intermediate connecting portion 223 between the first and second plates 221 and 224.

The slot guide groove 231 preferably has a depth identical or slightly greater than a thickness of the right plate 102 of the chassis 103 so that it can be inserted in the slide slot 235. Accordingly, the slide slot 235 is inserted in the slot guide groove 231 when the right intermediate member 220 coupled to the lower end 105b of the second right lever 105 is fixed on the chassis 103 in preferably a snapping manner.

The second right snap 230 may further comprise a locking member 260 (shown in FIG. 4) for preventing the right intermediate member 220 from being removed from the right plate 102 of the chassis 103 by the slot guide groove 231 being separated from the slide slot 235.

The locking member 260 comprises a locking projection 261 formed on an end of the second plate 224 of the right intermediate member 220 and a locking projection receiving portion 265 (See FIG. 4) formed facing the locking projection 261 on a front lower portion of the right plate 102 of the chassis 103.

Figure 7A:
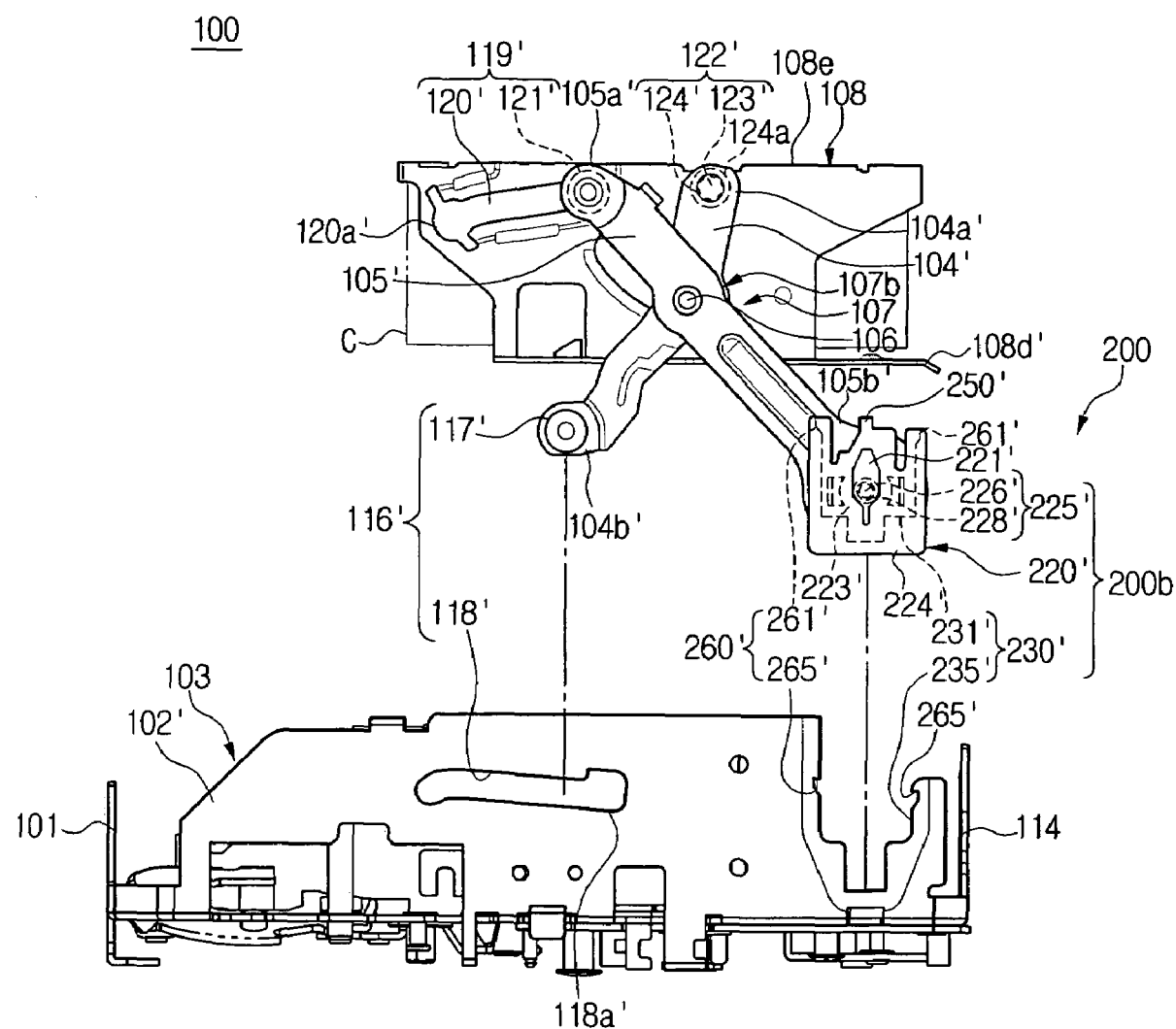
FIGS. 7A and 7B are respectively exploded left side and assembled left side views of a cassette housing depicted in FIG. 4.

As shown in FIGS. 4 and 7A, the left snap fixing unit 200b comprises a left intermediate member 220' installed between the lower end 105b' of the second left lever 105' of the left X-shaped lever assembly 107b and the left plate 102' of the chassis 103, a first left snap 225' rotatably fixing the lower end 105b' of the second left lever 105' to the left intermediate member 220', and a second left snap 230' fixing the left intermediate member 220' to the left plate 102' of the chassis 103.

Figure 8A:
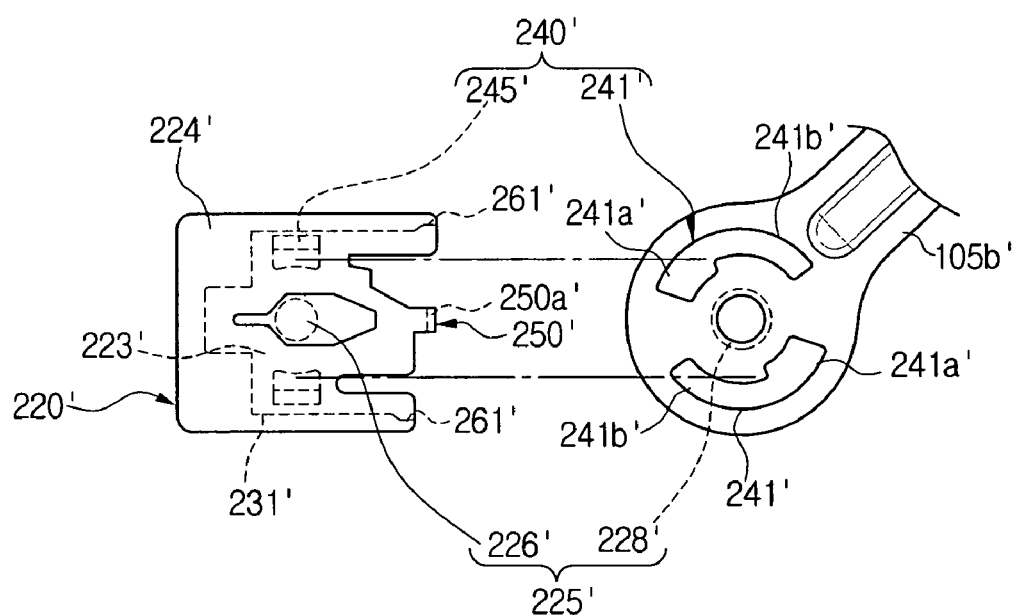
FIGS. 8A, 8B and 8C are respectively exploded left side, assembled left side and assembled perspective views of a left intermediate member and a first left snap of a left snap fixing unit of the lever fixing apparatus of a cassette housing depicted in FIGS. 5A and 5B.
Figure 8B:
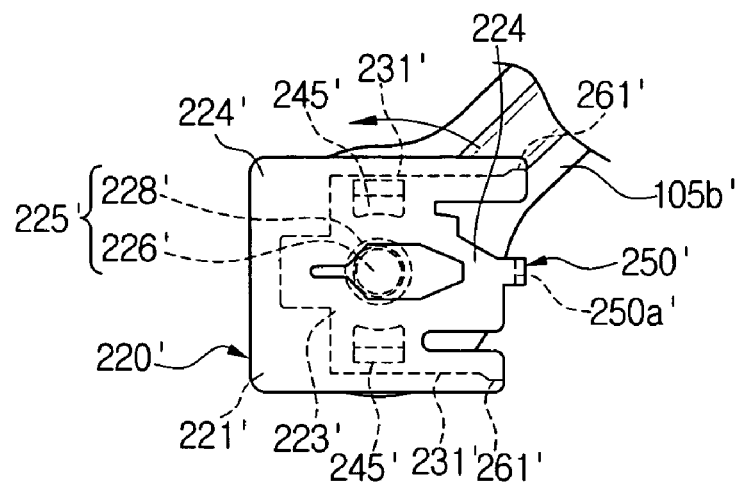
Figure 8C:
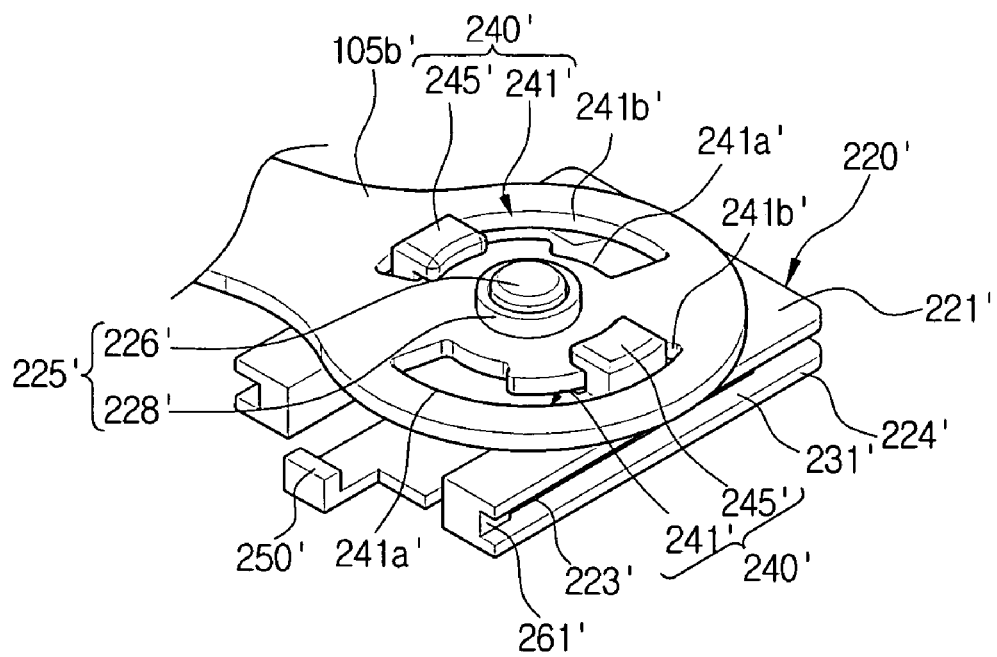

As shown in FIGS. 8A through 8C, the left intermediate member 220' comprises first and second plates 221' and 224' that are formed in a substantially rectangular shape and an intermediate connecting portion 223' connecting the first and second plates 221' and 224' to each other, preferably defining an I-shaped section.

The first plate 221' disposed facing the lower end 105b' of the second left lever 105' is provided with a second pivot boss 226' of the first left snap 225' and two hooks 245' of the separation preventing member 240'.

The separation preventing member 240' comprises two hooks 245' formed on a surface of the second plate 224' of the left intermediate member 220', which faces the lower end 105b' of the second left lever 105', and two hook receiving portions 241' formed on the lower end 105b' of the second left lever 105'. Each of the hook receiving portions 241' preferably has third assembling enlarging holes 241a' to receive the hook 245' and a supporting hole 241b' pivotally supporting the hooks 245' inserted through the third assembling enlarging hole 241a' at a predetermined angle. At this point, when the lower end 105b' of the second left lever 105' pivoting with respect to the left intermediate member 220' at a predetermined angle is hingedly operated, the hook 245' may be removed through the third assembling enlarging hole 241a'. To prevent this, the third assembling enlarging hole 241a' is formed out of the hinge operation range of the lower end 105b', in other words, out of the pivot operation range of the hooks 245' and the support holes 241b' is formed in the pivot operation range of the hooks 245'.

The intermediate member 223' has a width identical or slightly less than that of a slide slot 235' (see FIGS. 4 and 7A) of the second left snap 225'. Accordingly, a slot guide groove 231' (See FIGS. 8A through 8C) for receiving a slide slot 235' (shown in FIG. 4) of the second left snap 230' is formed along both edges of the intermediate connecting portion 223' between the first and second plates 221' and 224'.

Since the first left snap 225', the separation preventing member 240' and the position maintaining member 250' are identical to those of the right snap fixing unit 200a, the detailed description thereof has been omitted for the sake of clarity and conciseness.

As shown in FIG. 7A, the second left snap 230' comprises a slide slot 235' formed on the chassis 103 and a slide slot guide groove 231' formed on the left intermediate member 220' to be inserted in the slide slot 235'.

The slide slot 235' is formed in an opening defined by cutting the left plate 102' of the chassis 103 in a linear shape identical or larger than a size of the slide slot 235' of the second right snap 230. The slot guide groove 231' is, as shown in FIGS. 8A and 8C, formed in a ⊏-shaped (sideways U shaped) groove along both edges of the intermediate connecting portion 223' between the first and second plates 221' and 224'.

The slot guide groove 231' has a depth identical or slightly greater than a thickness of the left plate 102' of the chassis 103 so that it can be inserted in the slide slot 235'. Accordingly, the slide slot 235' is inserted in the slot guide groove 231' when the left intermediate member 220' coupled to the lower end 105b' of the second left lever 105' is fixed on the left plate 102' of the chassis 103 in the snap manner.

The second left snap 230' may further comprise a locking member 260' preventing the left intermediate member 220' from being removed from the left plate 102' of the chassis 103 by the slot guide groove 231' being separated from the slide slot 235'.

As shown in FIG. 8B, the position maintaining member 250' may be formed of a projection 250a' extending from the second plate 221' of the left intermediate member 220' to be in contact with the outer surface of the lower end 105b' of the second left lever 105'.

As shown in FIGS. 4, 7A, 7B and 8C, the locking member 260' comprises two elastic locking projections 261' formed on two ends of the slot guide groove 231' formed on the left intermediate member 220' and two locking projection receiving portions 265' formed facing the locking projections 261' on the sliding slot 235' formed on the left plate 102' of the chassis 103.

Referring again FIGS. 4, 5A and 5B, the locking lever 111 is rotatably coupled to the right plate 108a of the cassette holder 108 by the shaft pin 110.

The locking lever 111 comprises a hook projection 112 engaged with the hook portion 113a of the hook slot 113 formed on the firth plate 112 of the chassis 103 when the cassette holder 108 is located on the seating position.

When it is intended to position the cassette holder 108 holding the cassette C on the reel table of the deck, the hook projection 112 of the locking lever 111 is hooked on the hook portion 113a of the hook slot 113 of the chassis 103, thereby fixing the cassette holder 108 on the seating position. In addition, when it is intended to eject the cassette holder 108, the lower end 111a of the locking lever 111 is pushed by a locking lever driving unit (not shown) so that the hook projection 112 is released from the hook portion 113a of the hook slot 113. As a result, the right and left X-shape lever assemblies 107a and 107b are extended (spread or opened) by the eject spring 109, thereby the cassette holder 108 being upwardly moved to a position shown in FIGS. 5B and 7B.

The eject spring 109 is disposed to connect between the hook portion 159 of the upper end 105a of the second right lever 105 of the right X-shaped lever assembly 107a of the cassette holder elevating unit 107 and the upper end 111a of the locking lever 111.

The eject spring 109 is expanded by the upper end 105a of the first right lever 105 when the cassette holder 108 is located on the seating position where the hook projection 112 of the locking lever 111 is hooked on the hook portion 113a of the hook slot 113 of the chassis 103. Accordingly, the right and left X-shaped lever assemblies 107a and 107b are descended and folded. The eject spring 109 pulls the upper end 105a of the first right lever 105 when the cassette holder 108 is ejected by releasing the hook projection 112 from the hook portion 113a. Accordingly, the right and left X-shaped lever assemblies 107a and 107b are ascended and spread.

In the above-described embodiment, the right and left snap fixing unit 200a and 200b are installed between the lower ends 105b and 105b' of the second right and left levers 105 and 105' and the right and left plates 102 and 102' of the chassis 103. However, the present invention is not limited to this case. For example, the identical snap fixing units may be further installed between the upper ends 104a and 104a' of the first right and left levers 104 and 104' and the right and left plates 108A and 108B of the cassette holder 108, replacing the right and left hinge fixing units 122 and 122'.

The assembling operation of the above-described cassette housing will now be described in more detail with reference to FIGS. 4 and 8.

The cassette holder 108 having the right and left X-shaped lever assemblies 107a and 107b fixed on the right and left plates 108a and 108b are first prepared. At this point, the upper ends 104a and 104a' of the respective right and left levers 104 and 104' are respectively fixed on the right and left plates 108a and 108b of the cassette holder 108 by the right and left hinge fixing units 122 and 122'. The upper ends 105a and 105a' of the respective second right and left levers 105 and 105' are fixed on the right and left plates 108a and 108b by the second right and left sliding fixing unit 119 and 119'. In addition, the eject spring 109 pulls the upper end 105a of the first right lever 105 to upwardly open or spread the right and left X-shaped lever assemblies 107a and 107b.

Next, as shown in FIGS. 6A through 6C, the hook 245 of the separation preventing member 240 of the first right snap 225 is inserted into the second assembling enlarging hole 241a, the second pivot boss 226 is inserted into the second boss receiving hole 228 of the lower end 105b of the second right lever 220, and then the right intermediate member 220 of the right snap fixing unit 200a is rotated counterclockwise. As a result, the right intermediate member 220 is coupled to the lower end 105b of the second right lever 105.

Likewise, as shown in FIGS. 8A through 8C, the left intermediate member 220' of the left snap fixing unit 200b is coupled to the lower end 105b' of the second left lever 105'.

After the above, the first right and left levers 104 and 104' are respectively assembled on the right and left plates 102 and 102' of the chassis 103 by inserting the first sliding bosses 117 and 117' of the first right and left sliding fixing units 116 and 116' into the first sliding boss receiving holes 118 and 118' through the first assembling enlarging holes 118a and 118a'.

In this state, the second right and left levers 105 and 105' are pushed toward the slide slots 235 and 235' of the chassis 103. As a result, the slide slots 235 and 235' of the second right and left snaps 230 and 230' are inserted into the slot guide grooves 231 and 231' formed on the respective right and left intermediate members 220 and 220' to slide along the slot guide grooves 231 and 231' until the lower ends of the slide slots 235 and 235' contact the intermediate connection portions 223 and 223' of the right and left intermediate members 220 and 220'.

When the lower ends of the slide slots 235 and 235' almost contact the intermediate connection portions 223 and 223' of the right and left intermediate members 220 and 220', the locking projections 261 and 261' of the locking members 260 and 260' of the second right and left snaps 230 and 230' are locked in the locking projection receiving portions 265 and 265' so that the slide slots 235 and 235' are not removed from the slot guide grooves 231 and 231'.

Figure 7B:
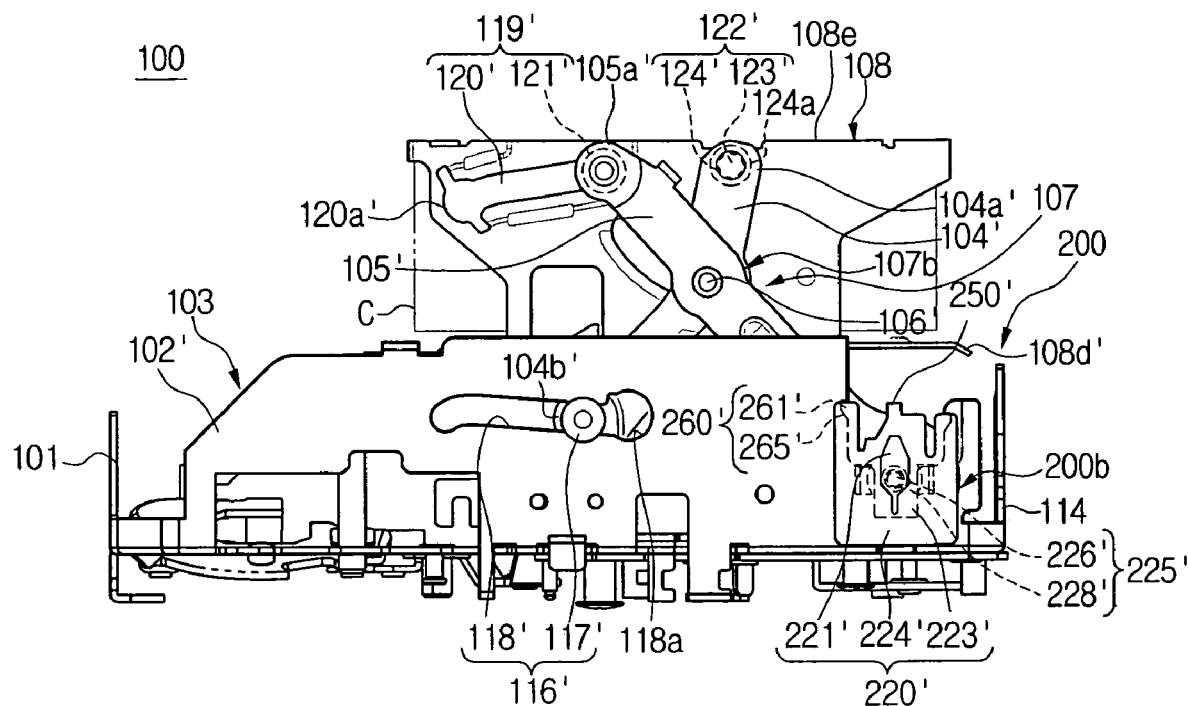

As a result, as shown in FIGS. 5B and 7B, the lower ends 104b and 104b' of the first right and left levers 104 and 104' are slidably supported in the first sliding boss receiving holes 118 and 118' of the first right and left sliding fixing units 116 and 116'. The lower ends 105b and 105b' of the second right and left levers 105 and 105' are supported on the right and left plates 102 and 102' of the chassis 103 by the separation preventing member 240, 240' to be capable of rotating at a predetermined angle in the hinge operation range of the levers. Also, the lower ends 105b and 105b' are locked on the right and left plates 102 and 102' by the locking members 260 and 260' of the second right and left snaps 230 and 230' so that they cannot be separated from the right and left plates 102 and 102' of the chassis 103. As a result, the assembly of the cassette holder 108 to the chassis 103 is completed.

The cassette seating and ejection operations of the cassette housing 100 will be described hereinafter.

The cassette seating operation will be described first.

From a state shown in FIGS. 5B and 7B, after the cassette C is inserted into the cassette holder 108, the cassette holder 108 is pressed downward.

When the cassette holder 108 is pressed downward, the locking lever 111 rotatably coupled to the right plate 108a of the cassette holder 108 by the shaft pin 11 is descended together with the cassette holder 108.

At this point, the second sliding bosses 121 and 121' of the upper ends 105a and 105a' of the second right and left levers 105 and 105' slide to a position adjacent to the second assembling enlarging holes 120a and 120a' of the second sliding boss receiving holes 120 and 120' of the second right and left sliding fixing unit 119 and 119', while overcoming elastic force of the eject spring 109 connected between the hook portion 159 of the upper end 105a of the second right lever 105 and the upper end 111a of the locking lever 111. The first sliding bosses 117 and 117' of the lower ends 104b and 104b' of the respective first right and left levers 104 and 104' slide to a position spaced away from the first assembling enlarging hole 118a of the first sliding boss receiving holes 118 and 118' of the first right and left sliding fixing units 116 and 116'.

In addition, although the second boss receiving holes 228 (not shown) and 228' of the first right and left snaps 225 and 225' rotates clockwise with respect to the second pivot bosses 226 and 226' from a position shown in FIGS. 6B and 8B, the second pivot boss 226 is not separated from the second boss receiving hole 228 by the separation preventing members 240 and 240'.

After the above description, the cassette holder 108 holding the cassette C is positioned on the seating position where the cassette holder 108 are seated on the reel table of the deck, the hook projection 112 of the locking lever 111 is hooked on the hook portion 113a of the hook slot 113. As a result, the cassette holder 108 is fixed on the seating position.

The cassette ejection operation will now be described in more detail.

In a state where the cassette holder 108 is positioned on the seating position, when an eject button (not shown) is pressed, the locking lever driving unit is operated to allow the lower end 111a of the locking lever 111 to be pushed rightward in FIG. 5B.

As a result, the hook projection 112 is released from the hook portion 113a of the hook slot 113.

At this point, since the upper end 105a of the second right lever 105 is pulled by the elastic force of the eject spring 109, the second sliding bosses 121 and 121' of the upper ends 105a and 105a' of the second right and left levers 105 and 105' slide to a location spaced away from the second assembling enlarging hole 120a of the second sliding boss receiving holes 120 and 120'. The first sliding bosses 117 and 117' of the lower ends 104b and 104b' of the first right and left levers 104 and 104' slide to a location near the location spaced away from the first assembling enlarging hole 118a of the first sliding boss receiving holes 118 and 118'.

In addition, the lower ends 105b and 105b' of the second right and left levers 105 and 105' is returned to its initial position depicted in FIGS. 6B and 8B as the second boss receiving holes 228 and 228' of the first right and left snaps 225 and 225' rotates counterclockwise to a predetermined angle with respect to the second pivot bosses 226 and 226'.

As a result, as shown in FIGS. 5A and 7B, the cassette holder 108 supported on the upper ends 104a, 104a' and 105a, 105a' of the first and second right and left levers 104a, 104a' and 105a, 105a' through the right and left hinge fixing units 122 and 122' and the second right and left sliding fixing units 119 and 119' is ascended by the ascending movement of the upper ends 104a, 104a' and 105a, 105a' of the first and second right and left levers 104a, 104a' and 105a, 105a' to be ejected, as a result of which the cassette C is removed from the cassette holder 108 or inserted into the cassette holder 108.

According to embodiments of the present invention, since the lever of the cassette holder is designed to be fixed to the chassis using the snap fixing units without using additional coupling parts, the number of processes for assembling the cassette holder to the housing bracket can be reduced, thereby reducing assembly time and increasing productivity.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A lever fixing apparatus of a cassette housing, comprising:
   at least one lever connecting a cassette holder to a chassis; and
   at least one snap fixing unit connecting the lever to at least one of the cassette holder and the chassis in a snap manner to hingedly fix the lever to the at least one of the cassette holder and the chassis, the at least one snap fixing unit including
      an intermediate member installed between the lever and the at least one of the cassette holder and the chassis;
      a first snap rotatably fixing the lever to the intermediate member; and
      a second snap fixing the intermediate member to the chassis.

2. The lever fixing apparatus of claim 1, wherein the first snap comprises:
   a pivot boss formed on one of the lever and the intermediate member; and
   a pivot boss receiving hole formed on the other one of the lever and the intermediate member.

3. The lever fixing apparatus of claim 2, wherein the first snap further comprises a separation preventing member preventing the pivot boss from being separated from the pivot boss receiving hole when the lever is hingedly operated.

4. The lever fixing apparatus of claim 3, wherein the separation preventing member comprises:
   at least one hook formed on one of the lever and the intermediate member; and
   at least one hook receiving member formed the other one of the lever and the intermediate member and provided with an assembling enlarging hole in which the hook is inserted and a supporting hole rotatably supporting the hook inserted through the assembling enlarging hole by a predetermined angle.

5. The lever fixing apparatus of claim 4, wherein the assembling enlarging hole is formed out of a hinge operation range of the lever and the supporting hole is formed in a pivot operation range of the lever.

6. The lever fixing apparatus of claim 2, wherein the first snap further comprises a position maintaining member preventing the intermediate member from being separated from an assembling position during the hinge operation of the lever.

7. The lever fixing apparatus of claim 6, wherein the position maintaining member comprises a projection extending from the intermediate member to be in contact with the lever.

8. The lever fixing apparatus of claim 1, wherein the second snap comprises:
   a slide slot formed on one of the intermediate member and the chassis; and
   a slot guide groove formed on the other one of the intermediate member and the chassis to correspond to the slide slot.

9. The lever fixing apparatus of claim 8, wherein the second snap further comprises a locking member preventing the slot guide groove from being separated from the slide slot.

10. The lever fixing apparatus of claim 9, wherein the locking member comprises;
    a locking projection formed on one of the intermediate member and the chassis; and a locking projection receiving portion formed on the other one of the intermediate member and the chassis.

11. A magnetic recording and reproducing apparatus, comprising:
   a cassette holder receiving a cassette;
   a chassis installed on a deck; and
   a cassette holder elevating unit supporting the cassette holder on the chassis to move the cassette holder between a seating position where the cassette holder is seated on a tape reel on the deck and an ejecting position where the cassette holder is ejected to remove or receive the cassette,
   wherein the cassette holder elevating unit comprises:
   a first lever having a first end hingedly fixed on the cassette holder and a second end slidably supported on the chassis;
   a second lever having a first end slidably supported on the cassette holder and a second end hingedly fixed on the chassis; and
   at least one snap fixing unit connecting at least one of the first end of the first lever and the second end of the second lever to at least one of the corresponding cassette holder and the corresponding chassis in a snap or hinge manner, the snap fixing unit including
      an intermediate member installed between the at least one of the first end of the first lever and the second end of the second lever and the at least one of the corresponding cassette holder and the corresponding chassis;
      a first snap rotatably fixing the at least one of the first end of the first lever and the second end of the second lever on the intermediate member; and
      a second snap fixing the intermediate member to the at least one of the cassette holder and the chassis.

12. The magnetic recording and reproducing apparatus of claim 11, wherein the first snap comprises:
   a pivot boss formed on one of the at least one of the first end of the first lever and the second end of the second lever and the intermediate member; and
   a pivot boss receiving hole formed on the other one of the at least one of the first end of the first lever and the second end of the second lever and the intermediate member.

13. The magnetic recording and reproducing apparatus of claim 12, wherein the first snap further comprises a separation preventing member preventing the pivot boss from being separated from the pivot boss receiving hole when one of the at least one of the first end of the first lever and the second end of the second lever is hingedly operated.

14. The magnetic recording and reproducing apparatus of claim 13, wherein the separation preventing member comprises:
   a hook formed on one of the at least one of the first end of the first lever and the second end of the second lever and the intermediate member; and
   a hook receiving member formed at the other one of the at least one of the first end of the first lever and the second end of the second lever and the intermediate member and provided with an assembling enlarging hole in which the hook is inserted and a supporting hole rotatably supporting the hook inserted through the assembling enlarging hole by a predetermined angle.

15. The magnetic recording and reproducing apparatus of claim 14, wherein the assembling enlarging hole is formed out of the hinge operation range of the hook and the supporting hole is formed in the pivot operation range of the hook.

16. The magnetic recording and reproducing apparatus of claim 11, wherein the second snap comprises:
   a slide slot formed on one of the at least one of the cassette holder and the chassis and the intermediate member; and
   a slot guide groove formed on the other one of the at least one of the cassette holder and the chassis and the intermediate member.

17. The magnetic recording and reproducing apparatus of claim 16, wherein the second snap further comprises a locking member preventing the slot guide groove from being separated from the slide slot.

18. The lever fixing apparatus of claim 17, wherein the locking member comprises;
   a locking projection formed on one of the at least one of the cassette holder and the chassis and the intermediate member; and
   a locking projection receiving portion formed on the other one of the at least one of the cassette holder and the chassis and the intermediate member.

* * * * *